UNITED STATES PATENT OFFICE 1,924,309

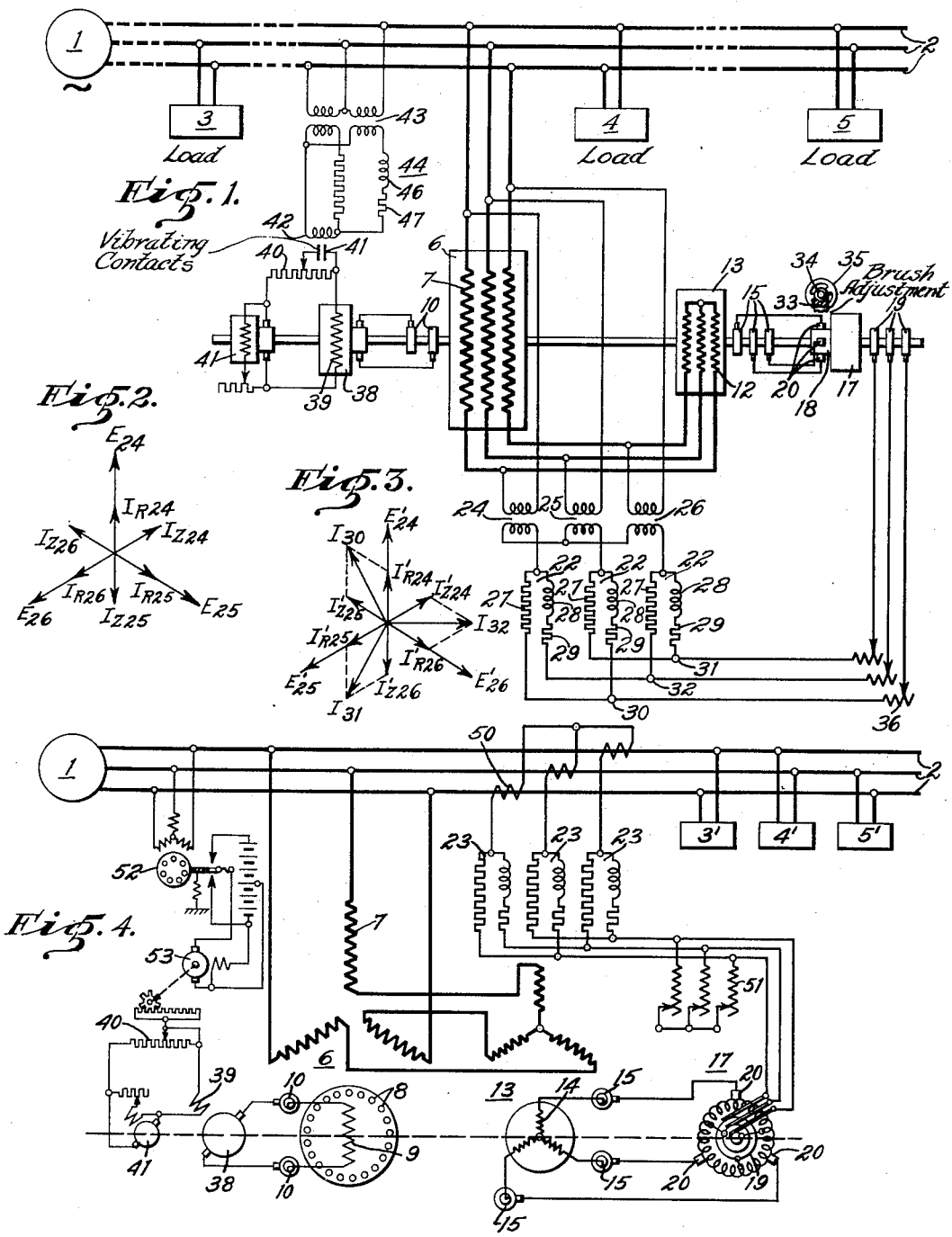

SHUNT PHASE-BALANCER

Alexander D. Dovjikov, Wilkinsburg, Pa., assignor to Westinghouse Electric & Manufacturing Company, a Corporation of Pennsylvania Application December 15, 1931
Serial No. 581,093

7 Claims. (Cl. 172—246)

The present invention relates to shunt phase-balancers and it has more particular relation to improvements in the means for making a shunt-balancer machine have a substantially zero negative-sequence impedance.

In many previous systems of phase balancers, it has been necessary to know to which phases of the line the single-phase load or loads were to be connected. There are cases, however, when it is not known which phase will be affected by the resultant unbalanced load, or this load may be connected at one time to one phase and the next time to any other phase, as happens, for example, when a three-phase system supplies single-phase railroad loads and the different sections of the trolley wire are connected to different phases of the source of supply.

An unbalanced load may be resolved into two component balanced loads,—one of positive phase-sequence, which is supplied by the generators of this system, and the other, of negative phase-sequence, which should be supplied entirely by the shunt phase-balancer. Each of these components is equal to $1/\sqrt{3} = 0.57$ or 57% of the single-phase load. As many single-phase loads are usually distributed between different phases, some of them balance each other and the capacity of the shunt phase-balancer must be equal to 57% of the expected resultant unbalance of all single-phase loads.

One of the objects of my invention is to provide a shunt phase-balancer which operates with only one voltage regulator, instead of three voltage regulators as have heretofore been utilized in connection with shunt phase-balancers. To make the shunt phase-balancer absorb all negative-sequence currents of the system, so as to maintain, at its terminals, balanced positive sequence voltage, the impedance of the phase-balancer to negative-sequence current must be made zero. To make the negative-sequence voltage-drop of the phase balancer equal to zero, it is necessary to introduce, into the windings of the phase-balancer, a negative-sequence booster voltage which is in series relation to the voltage-drop, and which is equal in magnitude, but in exact phase opposition, to the negative-sequence voltage-drop.

An important object of my invention is to supply this system of negative-sequence booster-voltage by means of a synchronous booster machine having polyphase armature windings connected in series to the primary windings of the shunt phase-balancer, and having polyphase field windings which are excited from polyphase commutator brushes of a rotary converter which is supplied by negative-sequence currents through a negative-sequence network. The relative amounts of direct current supplied by the respective polyphase commutator brushes of the rotary converter will thus produce, in the booster, a resultant magnetic flux having a phase position corresponding to the phase of the negative-sequence currents and having a magnitude corresponding to the magnitude of the negative-sequence currents, thus providing a very simple and effective means for securing the desired result.

With the foregoing and other objects in view, my invention consists in the apparatus and systems hereinafter described and claimed and illustrated in the accompanying drawing, wherein Figure 1 is a diagrammatic view of circuits and apparatus illustrating my invention in a preferred form of embodiment.

Figs. 2 and 3 are vector diagrams illustrative of the operation of the so-called polyphase negative-sequence voltage-network, and Fig. 4 is a diagrammatic view of circuits and apparatus illustrating my invention in a modified form.

In Fig. 1, I have illustrated the polyphase source 1, which may be a single synchronous generator, or a polyphase transmission system composed of a plurality of such machines, connected to a polyphase line 2 which supplies a plurality of independently variable single-phase loads 3, 4 and 5. Near the load-center of these single-phase loads is a shunt phase-balancer machine 6 having a polyphase primary winding 7, and, as shown in Fig. 4, a squirrel-cage secondary winding 8 or other short-circuited polyphase secondary winding having a low impedance and close magnetic coupling to the primary winding 7. The shunt phase-balancer is also preferably provided with a direct-current exciting winding 9 which is connected to slip rings 10.

Connected in series with the primary windings 7 of the phase-balancer are the polyphase armature windings 12 of a booster machine 13 which is a synchronous machine provided with a polyphase exciter winding 14 which is connected to three slip rings 15.

Direct current is supplied to the slip rings 15 by means of a rotary converter 17 having a commutator 18 and polyphase slip rings 19. The commutator 18 of the rotary converter, instead of having two brushes per pair of poles, as is customary, has three equally spaced brushes 20 which, for brevity, are referred to as polyphase commutator brushes. While the current supplied by these brushes is direct current, and the sum of the currents is equal to zero, the relative magnitudes of the currents in the respective brushes 20 are such as to produce a resultant flux, in the exciting windings of the booster 13, which varies in phase with the phase of the alternating currents supplied to the rotary converter through the slip rings 19. For brevity, I refer to this phenomenon by saying that the phase displacement of the exciting currents supplied by the commutator and of the rotary converter varies with the phase displacement of the alternating-current input. It will be obvious, of course, that the magnitude of the resultant flux produced in the polyphase exciting windings of the booster 13 will also be proportional to the magnitude of the alternating-current input of the rotary converter 17.

According to my invention, the alternating currents which are supplied to the rotary converter 17 are furnished by means of polyphase negative-sequence networks, which may be either voltage networks 22, as in Fig. 1, or current networks 23, as in Fig. 4. Referring, for the moment, to Fig. 1, the three-phase primary windings 7 of the shunt-balancer 6 are shunted by three potential transformers 24, 25 and 26, having secondary windings which are connected to the three negative-sequence networks 22, each phase of the network comprising two portions, namely, a pure resistance 27 and a 60° impedance comprising a reactance 28 and a resistance 29, so that the current in the resistance branch will be in phase with the applied voltage and the current in the impedance branch will lag 60° behind the same. The terminal of each impedance branch 28—29 is connected to the terminal of the resistance branch 27 in the next leading phase, thus producing three network output-terminals 30, 31 and 32 which carry only negative-sequence currents proportional to the negative-sequence components of the polyphase voltages supplied by the potential transformers 24, 25 and 26.

Although the phase-sequence network just described is well known, it may make the understanding of my invention clearer to refer to Figs. 2 and 3, in which I have indicated the positive and negative phase-sequence voltages of the potential transformers 24, 25 and 26, by the voltages $E_{24}$, $E_{25}$, $E_{26}$ and $E'_{24}$, $E'_{25}$, $E'_{26}$.

Referring to the positive-sequence diagram of Fig. 2, the positive-sequence currents in the resistance branches 27 of the network 22 are indicated by $I_{R24}$, $I_{R25}$ and $I_{R26}$, respectively; and the currents, lagging 60° behind the same, in the impedance branches 28—29 of the three networks 22 are indicated by $I_{Z24}$, $I_{Z25}$ and $I_{Z26}$. In Fig. 3, the corresponding negative-sequence currents are indicated by primes. Referring to Fig. 1, it will be noted that the current flowing out of the phase-sequence networks 22 from the terminal 30 is the resultant of the current in the resistance branch of phase 24 and the current in the impedance branch of phase 25. Reference to Fig. 2 will show that the resultant of these two currents is zero, for any positive-sequence applied voltage, but Fig. 3 shows that when the applied voltage is of negative-sequence, there is a resultant current $I_{30}$, $I_{31}$ and $I_{32}$, leading the applied negative-sequence voltage by 30°. Thus, regardless of the magnitude of the positive-sequence components of the voltages in the potential transformers 24, 25 and 26, no positive-sequence currents are produced in the output circuits 30, 31 and 32 of the polyphase phase-sequence network, whereas any negative-sequence voltage component of the potential transformers 24, 25 and 26 will produce negative-sequence currents having a phase position always exactly at 30° in advance of the phase position of the negative-sequence voltage, and having a magnitude exactly corresponding to the magnitude of the negative-sequence voltage.

The proper phase position of the direct currents supplied by the rotary converter to the field windings of the booster 13 may be controlled by any convenient means such, for example, as the phase position of the polyphase commutator brushes 20 on the rotary-converter commutator 18, which phase position may be made adjustable by mounting the brushes 20 on a worm-gear rocker-ring 33 which is rotatable by means of a worm 34 and a hand wheel 35 as indicated schematically in Fig. 1. The magnitude of the exciting currents supplied by the rotary converter 17, as compared to the magnitudes of the negative-sequence voltages in the potential transformers 24, 25 and 26, or, in other words, the conversion ratio, may be varied by means of impedances 36 placed somewhere in the power-flow circuit between the potential transformers 24, 25 and 26 and the field-winding slip-rings 15 of the booster 13.

The main machine or phase-balancer 6 is preferably supplied with automatic voltage regulation which is responsive only to positive-sequence voltages, rather than being responsive to the voltage in any one phase of the line 2, in order to avoid any possibility of hunting in the event of the sudden application or removal of single-phase loads, resulting in momentary unbalancing of the line voltages during the very brief interval necessary for the flux in the booster 13 to adjust itself to the changed condition.

As shown in Fig. 1, the field-winding slip-rings 10 of the shunt phase-balancer 6 are energized by means of an exciter 38 having a field winding 39 which is, in turn, energized through a resistance 40, from a pilot exciter 41. Part of the resistance is shunted in and out by the vibrating contact terminals 41 of a voltage regulator of any well known type, the line-voltage coils of which are schematically indicated at 42. Voltage for the regulator coils 42 is supplied by potential transformers 43 and a positive-sequence network 44 consisting of a resistance branch 45 in one phase and an impedance branch 46—47 in the next leading phase.

It will be noted that the phase-sequence network 44 of the voltage regulator is what I have termed a single-phase phase-sequence network, thereby designating the fact that the network has a single-phase output-circuit which makes it possible to use a single voltage-regulator 41—42; whereas the phase-sequence networks 22 constitute collectively what I term a polyphase phase-sequence network, thereby designating that the output terminals of the network constitute a polyphase circuit.

A modified form of my invention is shown in Fig. 4, in which the loads 3', 4' and 5' are all disposed so that the shunt phase-balancer 6 is connected to the line 2 between all of the unbalanced loads 3', 4' and 5' and the source 1. Since the negative-sequence impedance of the shunt phase-balancer 6 is a constant, its voltage-drop is proportional, in phase and magnitude, to the negative-sequence line currents which must be absorbed or supplied by the shunt phase-balancer. Hence a proper excitation of the rotary converter 17 may be secured by means of a current-responsive polyphase negative-sequence network 23 which is supplied from current transformers 50 in the line 2, between the shunt balancer 6 and unbalanced loads 3', 4' and 5'. In this case, if an adjustment of the magnitude of the exciter current is desired, it may conveniently be secured by means of shunt connected impedance 51.

Fig. 4 also shows, by way of illustration, a different form of selective positive-sequence regulating means, in which the function of the positive-sequence network 44 is taken over by a polyphase torque motor 52 which develops a torque corresponding to the positive-sequence voltage component, thereby energizing a rheostat motor 53 in the forward or backward direction to vary the amount of resistance 40 that is connected in circuit with the field winding 39 of the main exciter 38.

It will be observed that other modifications may be made in my invention without departing from the essential spirit thereof, and I desire, therefore, that the appended claims shall be accorded the broadest interpretation consistent with their language and the prior art.

I claim as my invention:

1. The combination with a polyphase dynamo-electric machine adapted to operate as a shunt phase balancer for short-circuiting negative-sequence voltages on an unbalanced polyphase line, of a polyphase negative-sequence booster having polyphase armature windings connected in series with the polyphase primary windings of said balancer machine, said booster having polyphase field windings, and means for exciting said booster field windings in accordance with the negative-sequence voltage-drop in the primary windings of said balancer machine.

2. The combination with a polyphase dynamo-electric machine adapted to operate as a shunt phase balancer for short-circuiting negative-sequence voltages on an unbalanced polyphase line, of a polyphase negative-sequence booster having polyphase armature windings connected in series with the polyphase primary windings of said balancer machine, said booster having polyphase field windings, and means for exciting said booster field windings in accordance with the negative-sequence voltage-drop in the primary windings of said balancer machine, said means comprising a polyphase negative-sequence network energized in parallel to said primary windings of said balancer machine.

3. The combination with a polyphase dynamo-electric machine adapted to operate as a shunt phase balancer for short-circuiting negative-sequence voltages on an unbalanced polyphase line, of a polyphase negative-sequence booster having polyphase armature windings connected in series with the polyphase primary windings of said balancer machine, said booster having polyphase field windings, and means for exciting said booster field windings in accordance with the negative-sequence voltage-drop in the primary windings of said balancer machine, said means comprising a polyphase negative-sequence network energized in parallel to said primary windings of said balancer machine, and a rotary converter having polyphase sliprings energized from said negative-sequence network and polyphase commutator brushes connected to said booster field windings.

4. The combination with a polyphase dynamo-electric machine adapted to operate as a shunt phase balancer for short-circuiting negative-sequence voltages on an unbalanced polyphase line, of a polyphase negative-sequence booster having polyphase armature windings connected in series with the polyphase primary windings of said balancer machine, said booster having polyphase field windings, and means for exciting said booster field windings in accordance with the negative-sequence voltage-drop in the primary windings of said balancer machine, said means comprising a polyphase negative-sequence network energized in parallel to said primary windings of said balancer machine, and a rotary converter having polyphase sliprings energized from said negative-sequence network and polyphase commutator brushes connected to said booster field windings, and means for adjusting the conversion ratio and the phase-displacement of the exciting currents supplied to said booster field windings.

5. The combination with a polyphase dynamo-electric machine adapted to operate as a shunt phase balancer for short-circuiting negative-sequence voltages on an unbalanced polyphase line, of a polyphase negative-sequence booster having polyphase armature windings connected in series with the polyphase primary windings of said balancer machine, said booster having polyphase field windings, a rotary converter having polyphase commutator brushes connected to said booster field windings, and a polyphase negative-sequence network for supplying current to said rotary converter.

6. The combination with a polyphase dynamo-electric machine adapted to operate as a shunt phase balancer for short-circuiting negative-sequence voltages on an unbalanced polyphase line, of a polyphase negative-sequence booster having polyphase armature windings connected in series with the polyphase primary windings of said balancer machine, said booster having polyphase field windings, a rotary converter having polyphase commutator brushes connected to said booster field windings, a polyphase negative-sequence network for supplying current to said rotary converter, and a plurality of current-transformers for energizing said negative-sequence network in accordance with the line current.

7. The combination with a polyphase synchronous dynamo-electric machine adapted to operate as a shunt phase balancer for short-circuiting negative-sequence voltages on an unbalanced polyphase line, of an exciter therefor, a single, selectively responsive, positive-sequence, voltage-regulator means for automatically increasing and decreasing the excitation of said synchronous balancer machine in response to departures from a predetermined polyphase voltage condition on said line and polyphase negative-sequence booster means selectively operative in response to a negative-phase-sequence electrical quantity for automatically supplying said synchronous balancer machine with negative-sequence booster voltages having a phase and magnitude substantially equal and opposite to the negative sequence voltage-drops in said synchronous balancer machine.

ALEXANDER D. DOVJIKOV.